United States Patent
Weymouth

(10) Patent No.: US 10,435,042 B1
(45) Date of Patent: Oct. 8, 2019

(54) MODULAR CARGO CONTAINMENT SYSTEMS, ASSEMBLIES, COMPONENTS, AND METHODS

(71) Applicant: Ronald T. Weymouth, Clarksville, TN (US)

(72) Inventor: Ronald T. Weymouth, Clarksville, TN (US)

(*) Notice: Subject to any disclaimer, the term of this patent is extended or adjusted under 35 U.S.C. 154(b) by 532 days.

(21) Appl. No.: 14/689,028

(22) Filed: Apr. 16, 2015

Related U.S. Application Data

(60) Provisional application No. 61/980,314, filed on Apr. 16, 2014.

(51) Int. Cl.
- *B65D 88/12* (2006.01)
- *B61D 45/00* (2006.01)
- *B65D 90/00* (2006.01)
- *B60P 3/00* (2006.01)

(52) U.S. Cl.
CPC .............. *B61D 45/006* (2013.01); *B60P 3/00* (2013.01); *B61D 45/00* (2013.01); *B65D 88/12* (2013.01); *B65D 90/00* (2013.01); *B65D 90/004* (2013.01)

(58) Field of Classification Search
CPC ...... B61D 45/006; B61D 45/00; B65D 88/12; B65D 90/004; B65D 90/00; B60P 3/00
USPC ........... 296/100.01, 100.02, 100.09; 217/13, 217/43 A, 45, 12 R, 43 R, 12 A; 206/600; 105/377.01, 377.1, 377.11, 378; 108/54.1, 56.1, 56.3, 57.25, 57.27, 108/159.11, 901; 220/4.26, 4.27, 4.28, 220/23.4, 23.6
See application file for complete search history.

(56) References Cited

U.S. PATENT DOCUMENTS

| | | | | |
|---|---|---|---|---|
| 203,961 | A | * | 5/1878 | Van Siclen |
| 2,640,616 | A | * | 6/1953 | Clements ................. B65D 9/34 190/19 |
| 4,914,874 | A | * | 4/1990 | Graham, Jr. ............. B65D 9/32 217/43 A |
| 6,488,329 | B1 | * | 12/2002 | Smith .................... B60J 7/1621 296/100.01 |
| 8,794,463 | B2 | * | 8/2014 | Rio Gonzalez ........ B65D 5/001 206/503 |

* cited by examiner

*Primary Examiner* — Stephen T Gordon
(74) *Attorney, Agent, or Firm* — Fantastic IP Consulting; Eduardo E. Drake

(57) ABSTRACT

To provide a better way of protecting cargo on flatbed trucks, railcars, and so forth, the present inventor, devised among other things a cargo containment system formed from a set of interconnectable weatherproof panels that can be configured to define a rectilinear containment structure over and around a volume of cargo.

9 Claims, 4 Drawing Sheets

MODULAR CARGO CONTAINMENT SYSTEMS, ASSEMBLIES, COMPONENTS, AND METHODS

COPYRIGHT NOTICE AND PERMISSION

A portion of this patent document contains material subject to copyright protection. The copyright owner has no objection to the facsimile reproduction by anyone of the patent document or the patent disclosure, as it appears in the patent and trademark office patent files or records, but otherwise reserves all copyrights whatsoever. The following notice applies to this document: Copyright © 2014, RONALD T. WEYMOUTH.

RELATED APPLICATION

The present application claims priority to U.S. Provisional Patent Application 61/980,314, which was filed on Apr. 16, 2014 and which is incorporated herein by reference.

TECHNICAL FIELD

Various embodiments of the invention relate generally to cargo containers and related transportation and storage methods.

BACKGROUND

In a modern, vibrant economy, moving goods and supplies from one place to another is a critical function. Trucking is one common way of moving goods and supplies across land, with many trucks having flatbeds, that is open beds with no walls. Trucks with these types of beds, generally flat-bed trucks, offer the advantage that loading and unloading can occur from multiple directions, including from above, as opposed to the rear-only constraint of tractor trailers. Once loaded on a flatbed, the cargo is generally covered with tarps or netting, and secured in place with tie-down straps.

The present inventor has recognized that containing cargo on flatbed trucks in this conventional manner is problematic. For example, the netting and tarps are a weak form of protection that leaves cargo vulnerable to accidental damage and theft. Although rigid cargo boxes are sometimes available for added protection, the boxes are generally fixed in size, forcing use of boxes that are often larger than necessary. This reduces fuel economy through added weight and wind-resistance. Moreover, the fixed boxes not only undermine the rapid loading and unloading advantages of flatbeds, but also require considerable storage space when not in use.

Accordingly, the present inventor has identified a need for a better way of protecting cargo on flatbed trucks.

SUMMARY

To address one or more of these and/or other needs or problems, the present inventor devised, among other things, one or more exemplary systems, kits, methods, devices, assemblies, and/or components related to cargo containment, particularly containment on flatbed trucks and railcars.

In one exemplary embodiment, the invention takes the form of a cargo containment system formed from a set of interconnectable weatherproof panels that can be configured to define a rectilinear containment structure over and around a volume of cargo. The exemplary system includes three types of panels: left-right side panels, front-back side panels, and top panels. A pair of left-right panels and a pair of front-back panels can be interconnected via manual latching mechanisms, for example draw latches, to define a square or rectantangular perimeter wall around the volume of cargo. A pair of top panels overlays the perimeter wall to fully enclose the cargo, latching security to at least two of the panels forming the perimeter wall. The height of the perimeter wall can be expanded with addition of another four panels.

In some embodiments, each panel is formed of a durable thermoelastic plastic through injection-, blow-, or roto-molding techniques. In some embodiments the panels are hollow, and in others they are filled with a open or closed cell foam or other insulative material. The interface between panels in some embodiments include weather stripping to prevent water and sand from entering interior volume defined by the panels. The panels are labeled to depict which side of each panel is connected to which sides of another panel. The panels may also include tie down strap anchors, which allow cargo straps to hook over the entire unit and back into the vehicle for secure positioning.

Still further, the apparatus has draw-latches with inner and external locking mechanism to prevent the unit from unlatching if bumped or goes over a bump.

BRIEF DESCRIPTION OF THE DRAWINGS

Various embodiments are described herein with reference to the following attached figures (Figs). These figures are annotated with reference numbers for various features and components, and these numbers are used in the following description as a teaching aid, with like numbers referring to the same or similar features and components.

FURTHER DESCRIPTION OF EXEMPLARY EMBODIMENT(S)

This document, which incorporates drawings and claims, describes one or more specific embodiments of one or more inventions. These embodiments, offered not to limit but only to exemplify and teach the invention, are shown and described in sufficient detail to enable those skilled in the art to implement or practice the invention(s). Thus, where appropriate to avoid obscuring the invention(s), the description may omit certain information known to those of skill in the art.

Figure 1:
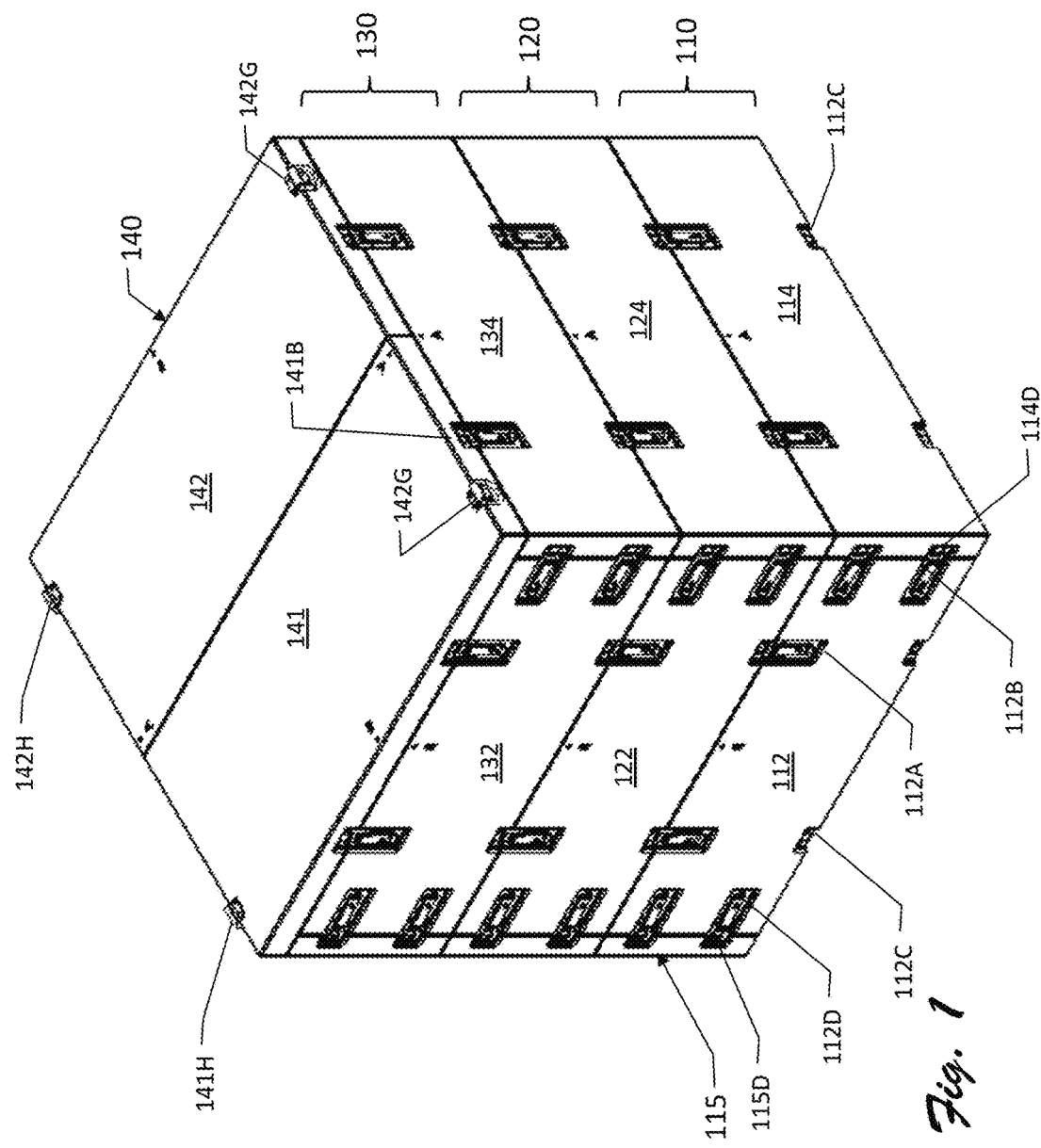
FIG. 1 is an isometric view of an exemplary cargo containment system 100, which corresponds to one or more embodiments of the present invention.
Figure 2:
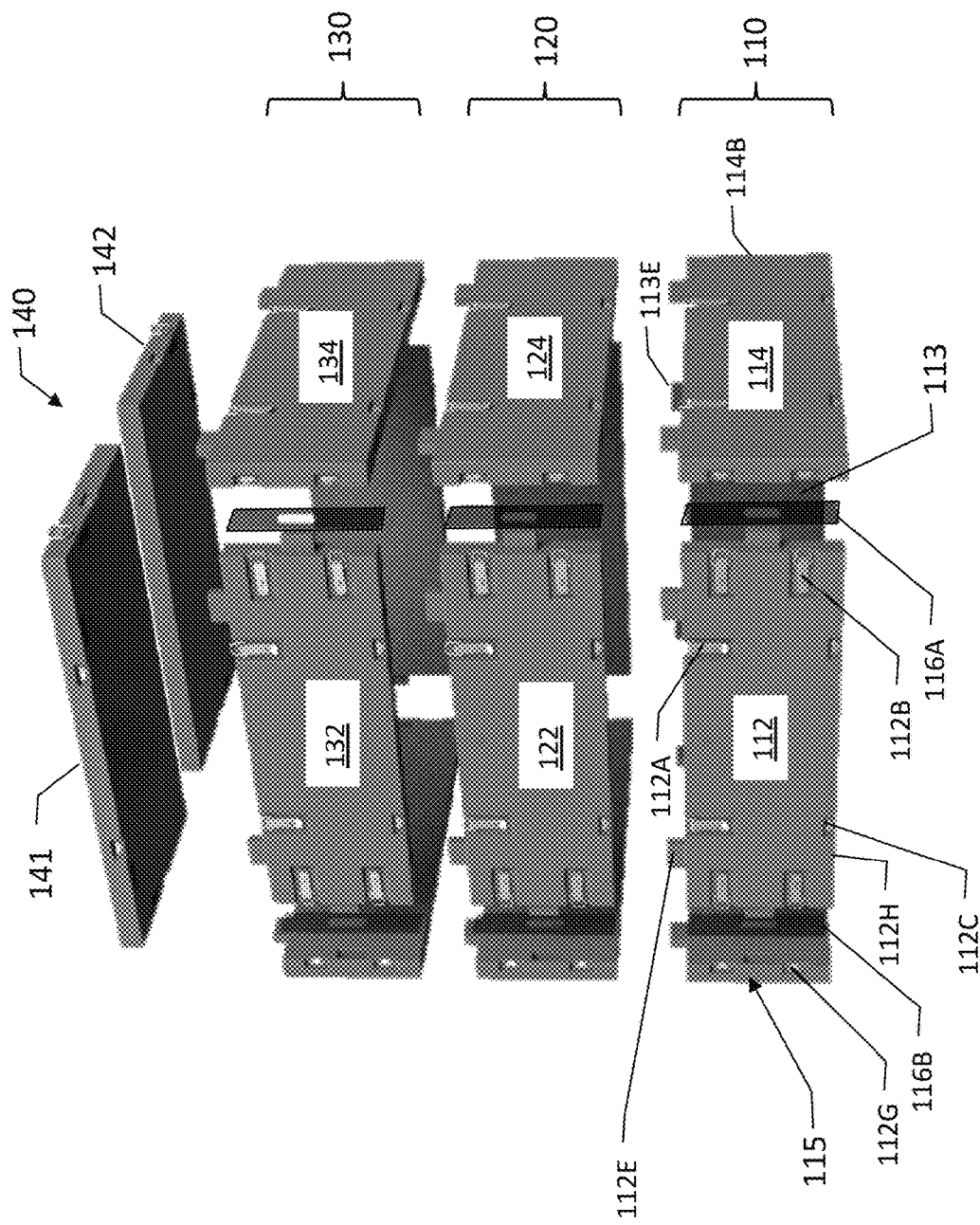
FIG. 2 is a exploded isometric view of FIG. 1 system corresponding to one or more embodiments of the present invention.

FIGS. 1 and 2 show a reconfigurable modular cargo containment system 100, with FIG. 1 being an isometric view and FIG. 2 being an exploded isometric view. System 100, as shown, includes 14 rectangular thermoplastic elastomer panels, that define three vertically stacked perimeter wall structures 110, 120, and 130 and a cover structure 140.

Perimeter wall structure 110, best shown in FIG. 2, includes a pair of opposing front-back panels 112 and 113, a pair of left-right panels 114 and 115, and foam weather strips 116A, 116B, 116C, and 116D. Front-back panel 112, which is substantially identical to and interchangeable with panel 113, includes respective top, right, bottom, and left pairs of latch members 112A, 112B, 112C, and 112D. Each of the latch members is positioned in a corresponding recess (not visible in FIG. 1 and not labeled in FIG. 2) on the outer surface of panel 112, with top, right, and left pairs of latch members being latch handle portions of a draw latch in the exemplary embodiment, and with the bottom pair of latch members 112C being draw latch keepers.

Additionally, front-back panel 112 includes integrally molded top tenon members 112E extended from its top edge and integrally molded right and left tenon members 112F and 112G (FIG. 2) extending respectively from its left and right edges. Panel 112 also includes integrally molded mortise regions 112H on its bottom edge. Right and left tenon members 112F and 112G are configured to engage in an interference fit with respective mortise regions 114F and 115G on corresponding interior faces of left-right panels 114 and 115. Left latch members 112B are configured to latch respectively with left latch members 114C on panel 114, and right latch members 112D are configured to latch respectively with corresponding latch members 115D on panel 115.

Left-right panel 114, which is substantially identical to and interchangeable with panel 115, includes on its outer surface top latch members 114A, right latch members 114B, bottom latch members 114C, and left latch members 114D. In the exemplary embodiment, top latch members 114A are handle portions of draw latches, and latch members 114B, 114C, and 114D are draw latch keeper portions.

Panel 114 and 115 are joined to front-back panel 113 via right latch members 114B and left latch members 115B and right and left mortise regions (not visible). Panel 113 also includes top tenon members 113E.

Weather strips 116A, 116B, 116C, and 116D are positioned at the corner interfaces between panels 112 and 114, between panels 112 and 115, between 115 and 113, and between panels 113 and 114. In the exemplary embodiment, the weather strip includes a slot through which the left or right tenon member of panels 112 and 113 passes into the corresponding left or right mortise region of panels 114 and 115. In the exemplary embodiment, each weather strip takes the form of a sheet of open or closed cell foam that is adhered to a left or right edge of one of the front-back panels.

In addition to perimeter wall structure 110, containment system also includes perimeter wall structures 120 and 130, both of which are substantially identical to and interchangeable with wall structure 110 and with each other. Perimeter wall structure 120 is latched to wall structure 110 via connection of top latch members on panels 112, 113, 114, and 115 to corresponding bottom latching members on panels 122, 123, 124, and 125. Additionally, top tenon memers on panels 112, 113, 114, and 115 form an interference fit with the bottom mortise regions (not visible) of panels 122, 123, 124, and 125. Perimeter wall structure 130 is similarly connected to wall structure 120 via top latch and tenon members on perimeter wall 120, and bottom latch members and mortise regions on wall structure 130. Positioned on top of wall structure 130 is cover structure 140.

Cover structure 140 includes cover panels 141 and 142, which are substantially identical to and interchangeable with each other in the exemplary embodiment. Cover panel 141 includes side latch members 141A, respective right and left end latch members 141B and 141C, respective front and back mortise regions 141D and 141E, respective right and left end mortise regions 141E and 141F, and right and left end tie-down anchors 141G and 141H. Cover panel 142 similarly includes side latch members 141A, respective right and left end latch members 142B and 142C, respective front and back mortise regions 142D and 141E, respective right and left end mortise regions 142E and 142F, and right and left end tie-down anchors 142G and 142H. Cover panels 141 and 142 are fastened to perimeter wall structure via their corresponding latching members and corresponding mortise and tenon members, providing a secure containment structure for cargo within the volume defined by the surface area witin the perimeter wall structure and the aggregate height of all the perimeter wall structures.

Figure 3:
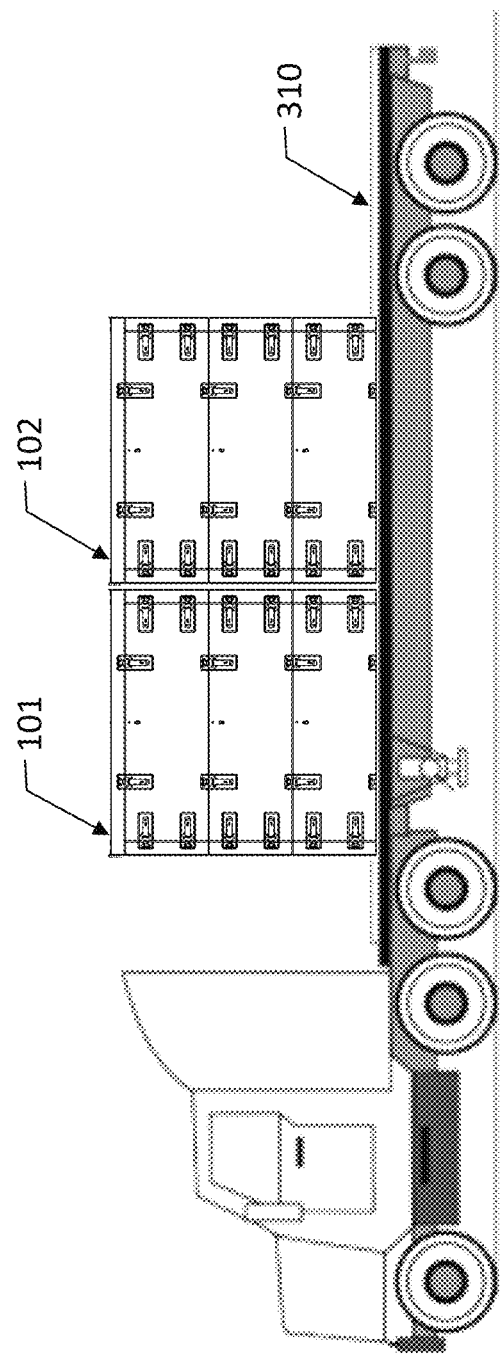
FIG. 3 is an side view of an exemplary transport system 300 incorporating the FIG. 1 system and thus corresponding to one or more embodiments of the present invention.

FIG. 3 shows a flatbed cargo transport system 300 which incorporates system 100. System 300 includes a flatbed platform 310 and two cargo containment systems 101 and 102, which incorporate the teachings of the present invention.

Figure 4:
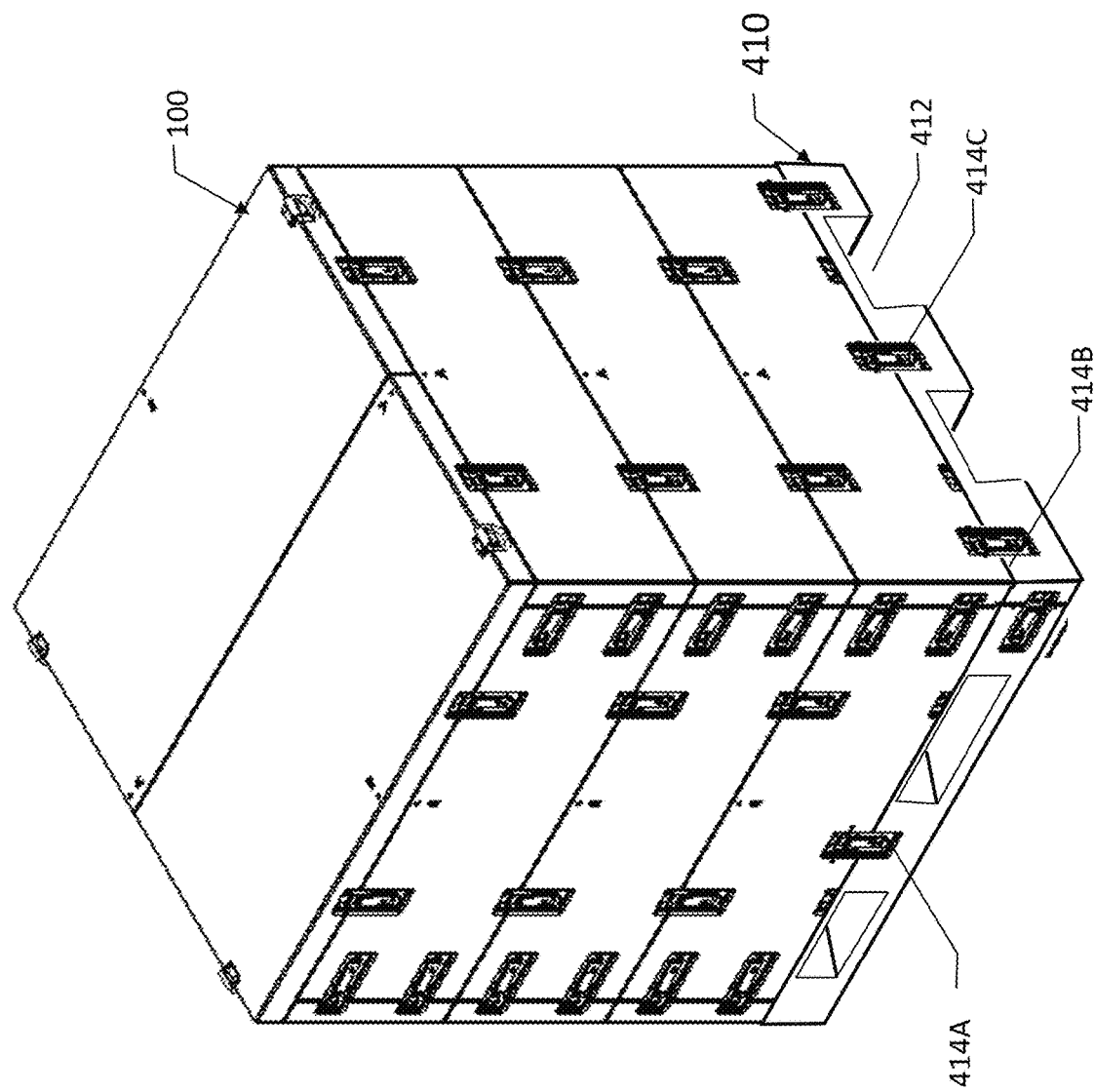
FIG. 4 is an isometric view of an exemplary cargo containment system 400 which includes a pallet assembly and thus corresponding to one or more embodiments of the present invention.

FIG. 4 shows an alternative cargo containment system 400. System 400 is substantially identical in form and function to system 100, with the exception that it includes an integrated pallet assembly 410. Pallet assembly 410, which is compatible with conventional fork lift systems, includes handjack notches or fork lift openings 412 and latching members 414A, 414B, 414C, 414D for fastening to the bottom latching members perimeter wall structure 110. Some embodiments include tenon members for engaging the bottom mortise regions of the wall structure.

In the exemplary embodiment, the pallet assembly is formed of composite decking or other highly durable plastics and weather proof materials. Some embodiments, also include one or more keyed or electrical locks as part of the latching structure to provide additional security.

CONCLUSION

In the foregoing specification, specific exemplary embodiments have been described. However, one of ordinary skill in the art appreciates that various modifications and changes can be made without departing from the scope of the invention as set forth in the claims below. For example, other types of latching and fastening mechanism can be used other than the draw latches and mortise and tenon structures described herein. For example, some embodiments use compression latches, rotary latches, cam locks, or other similar latch type. Any type of releasable mechanical fastener or clamping mechanism is believed to be feasible. Also, tongue and groove joints may also be used in place of or to augment the mortise and tenons shown here. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms, such as second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the term "exemplary" is used as an adjective herein to modify one or more nouns, such as embodiment, system, method, device, and is meant to indicate specifically that the noun is provided as a non-limiting example.

The invention claimed is:

1. A bottomless stacked cargo containment assembly configured to encircle a volume of cargo on a flatbed truck or railcar, the assembly comprising:
   a first perimeter wall structure including first and second pairs of complementary wall panels fastened together via a first set of latch members;
   a second perimeter wall structure including third and fourth pairs of complementary wall panels fastened together via a second set of latch members, the second perimeter wall structure stacked on top of the first perimeter wall structure and fastened thereto by a third set of latch members to define a stack;
   wherein the first perimeter wall structure is the lowermost portion of the stack and has no bottom wall.

2. The cargo containment assembly of claim 1, further comprising at least one roof panel member positioned on top of the second perimeter wall structure.

3. The cargo containment assembly of claim 2, further comprising a fourth set of latch members configured to fasten the one roof panel member to the second perimeter wall structure.

4. The cargo containment assembly of claim 1, wherein each of the first, second, and third latch members is a draw latch member.

5. The cargo containment assembly of claim 1:
   wherein the first and second perimieter wall structures define respective first and second closed loops;
   wherein each wall panel includes a generally rectangular thermoelastic plastic panel.

6. The cargo containment assembly of claim 1, wherein each pair of complementary wall panels comprises a side panel and an end panel joined together to define a corner, with each side panel having first and second opposing end faces having respective first and second integrally molded mortises formed therein and each end panel having first and second opposing end faces having respective first and second integrally molded tenons extending therefrom, with the first tenon engaged with the first mortise to reinforce the corner via a mortise-and-tenon joint.

7. The cargo containment assembly of claim 6, wherein each wall panel is blow- or roto-molded of plastic, and filled with an open- or closed-cell foam.

8. The cargo containment assembly of claim 6, wherein each wall panel has a top edge face and an opposing bottom edge face, with each top and bottom edge face having at least one of an integrally molded mortise formed therein or an integrally molded tenon extending therefrom.

9. The cargo containment assembly of claim 6, wherein each perimeter wall structure further includes weather stripping between end faces of at least one mortise-and-tenon joint.

* * * * *